(12) United States Patent
Yoon et al.

(10) Patent No.: US 8,351,015 B2
(45) Date of Patent: Jan. 8, 2013

(54) LIQUID CRYSTAL DISPLAY PANEL AND METHOD FOR TESTING THE SAME

(75) Inventors: Jae-Ho Yoon, Chilgok-gun (KR); Dae-Young Seok, Daegu (KR)

(73) Assignee: LG Display Co., Ltd., Seoul (KR)

( * ) Notice: Subject to any disclaimer, the term of this patent is extended or adjusted under 35 U.S.C. 154(b) by 611 days.

(21) Appl. No.: 12/561,945

(22) Filed: Sep. 17, 2009

(65) Prior Publication Data
US 2010/0066968 A1 Mar. 18, 2010

(30) Foreign Application Priority Data
Sep. 18, 2008 (KR) .................. 10-2008-0091748

(51) Int. Cl.
*G02F 1/13* (2006.01)
*G02F 1/1345* (2006.01)
*G02F 1/1333* (2006.01)
(52) U.S. Cl. .................. 349/192; 349/54; 349/149
(58) Field of Classification Search .............. 349/54, 349/149, 192
See application file for complete search history.

(56) References Cited

U.S. PATENT DOCUMENTS

| 7,110,057 | B2 | 9/2006 | Jeon | |
| 2005/0195338 | A1* | 9/2005 | Matsumoto et al. | 349/40 |
| 2008/0198286 | A1* | 8/2008 | Wu et al. | 349/40 |
| 2012/0008076 | A1* | 1/2012 | Ohta et al. | 349/122 |

FOREIGN PATENT DOCUMENTS
KR 10-2003-0054937 A 7/2003

* cited by examiner

*Primary Examiner* — Nathanael R Briggs
(74) *Attorney, Agent, or Firm* — Birch, Stewart, Kolasch & Birch, LLP

(57) ABSTRACT

The present invention relates to a liquid crystal display panel and a method for testing the same. The liquid crystal display panel includes at least one testing signal supply line having first and second horizontal portions spaced from each other for applying a testing signal to the liquid crystal display panel, first and second electrolytic corrosion blocking patterns connected to ends of the first and second horizontal lines respectively on a substrate and isolated from each other for prevention of transmission of the electrolytic corrosion from the first horizontal portion to the second horizontal portion, and a connection pattern formed of a material resistant to the electrolytic corrosion for connecting the first horizontal portion to the second horizontal portion, electrically.

5 Claims, 10 Drawing Sheets

FIG. 3
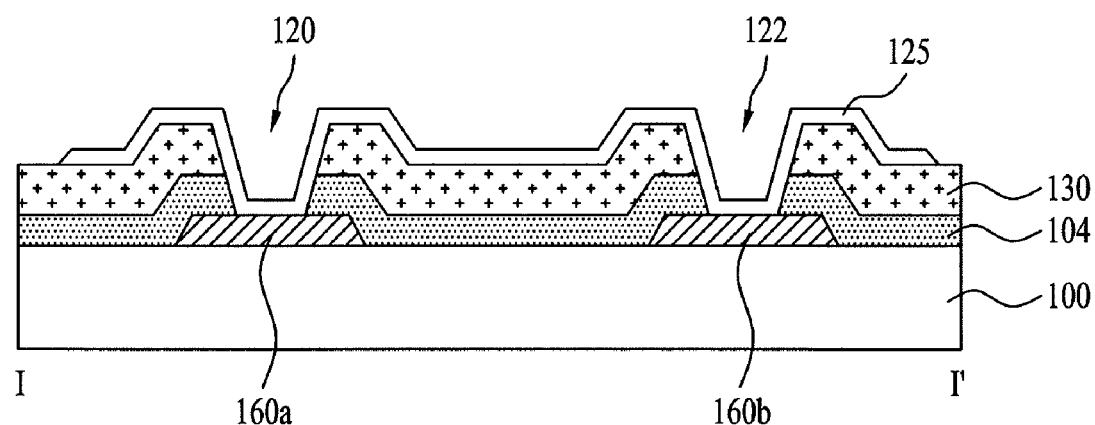
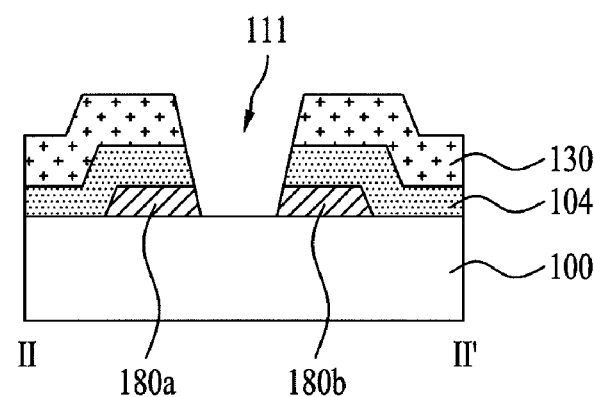
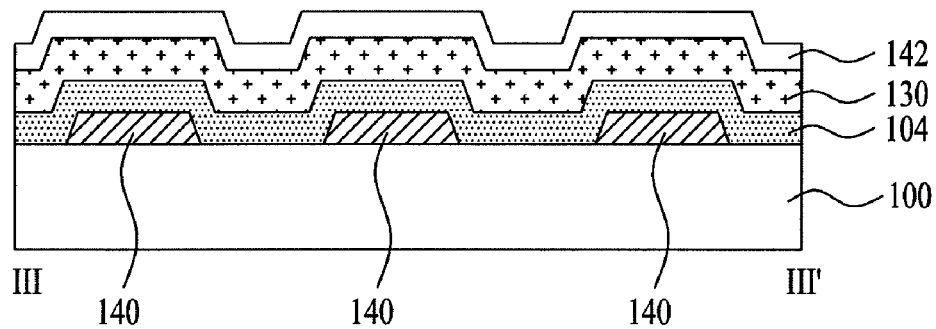

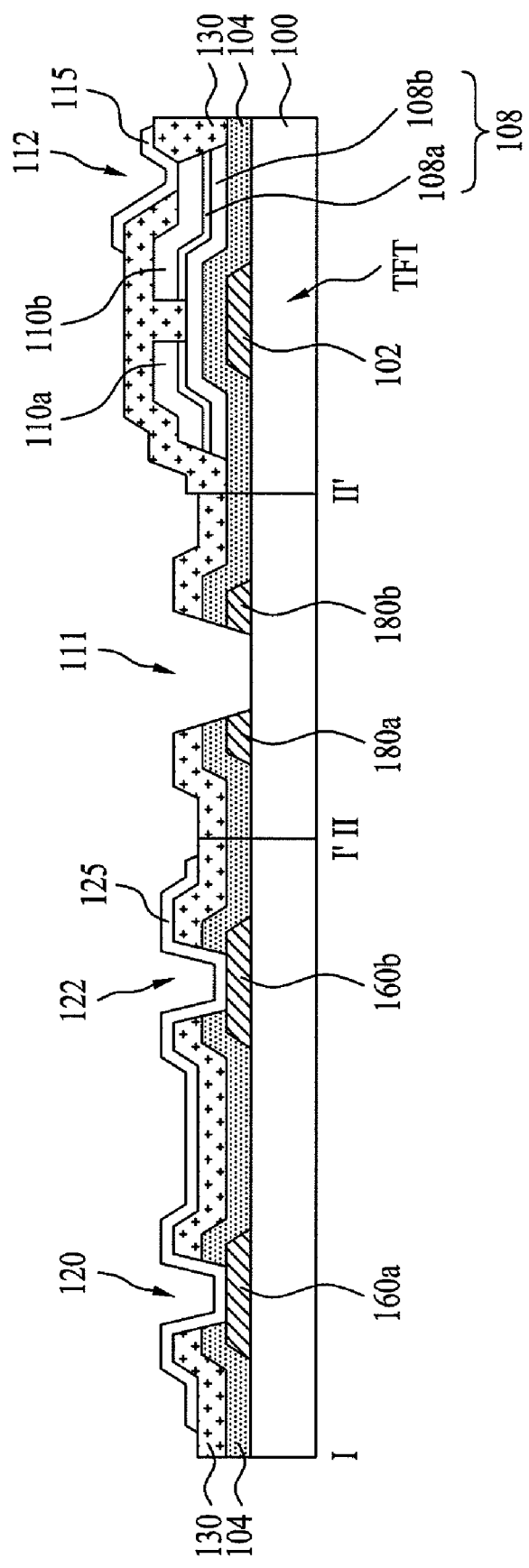

LIQUID CRYSTAL DISPLAY PANEL AND METHOD FOR TESTING THE SAME

CROSS REFERENCE TO RELATED APPLICATION

This application claims the benefit of the Korean Patent Application No. 10-2008-0091748, filed on Sep. 18, 2008, which is hereby incorporated by reference as if fully set forth herein.

BACKGROUND OF THE DISCLOSURE

1. Field of the Disclosure

The present invention relates to a liquid crystal display panel, and, more particularly, to a liquid crystal display panel which can prevent electrolytic corrosion from transmitting to the liquid crystal display panel from an outer portion of the panel which is a testing line, and a method for testing the same.

2. Discussion of the Related Art

In general, a liquid crystal display device is provided with the liquid crystal display panel for displaying a picture by utilizing electric and optical properties of liquid crystals, and a driver for applying a driving signal to the liquid crystal display panel.

The liquid crystal display panel has first and second substrates bonded with a gap therebetween, and a liquid crystal layer formed between the first and second substrates. The liquid crystal display panel is fabricated by a process having a thin film transistor array step for forming thin film transistors on the first substrate, and a color filter array step for forming a color filter on the second substrate. Fabrication of the liquid crystal display panel is finished by bonding the first substrate having the thin film transistor array formed thereon and the second substrate having the color filter array formed thereon together through a cell step, with the liquid crystal layer disposed therebetween.

The liquid crystal display panel finished thus is tested to determine if the liquid crystal display panel has defects or not, and the liquid crystal display panel which is determined to have no defects has a polarization plate attached to an outer side of the liquid crystal display panel, and a driving circuit connected thereto, thereby finishing fabrication of the liquid crystal display device.

Referring to FIG. 1A, in the testing process, after determining existence of defects by using testing signal supply lines 12 and 14 which apply signals to the liquid crystal display panel 10, a portion having the testing signal supply lines 12 and 14 formed thereon is scribed SCR, to cut off the portion. However, if electrolytic corrosion takes place at a cut surface due to chemical or substrate contamination, the electrolytic corrosion transmits to an inside of the liquid crystal display panel 10 in a direction of the arrows through the testing signal supply lines 12 and 14 like the electrolytic corrosion portions shown in FIG. 1B, to cause a crack which leads to a defect of seal breakage.

SUMMARY OF THE DISCLOSURE

Accordingly, the present invention is directed to a liquid crystal display panel and a method for testing the same.

An object of the present invention is to provide a liquid crystal display panel which can prevent electrolytic corrosion from transmitting to the liquid crystal display panel from an outer portion of the panel which is a testing line, and a method for testing the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display panel includes at least one testing signal supply line having first and second horizontal portions spaced from each other for applying a testing signal to the liquid crystal display panel, first and second electrolytic corrosion blocking patterns connected to ends of the first and second horizontal lines respectively on a substrate and isolated from each other for prevention of transmission of the electrolytic corrosion from the first horizontal portion to the second horizontal portion, and a connection pattern formed of a material resistant to the electrolytic corrosion for connecting the first horizontal portion to the second horizontal portion, electrically.

In another aspect of the present invention, a method for testing a liquid crystal display panel includes the steps of forming gate lines and at least one testing signal supply line having first and second horizontal portions spaced from each other for applying a testing signal to the liquid crystal display panel, and first and second electrolytic corrosion blocking patterns connected to ends of the first and second horizontal lines respectively on a substrate, testing shorts of the gate lines, forming a gate insulating film on the testing line and the first and second electrolytic corrosion blocking patterns, forming first and second contact holes which expose the first and second horizontal portions and a third contact hole which exposes the electrolytic corrosion blocking pattern, dividing a connection pattern formed of a material resistant to the electrolytic corrosion for connecting the first horizontal portion to the second horizontal portion through the first and second contact holes, and the first and second electrolytic corrosion blocking patterns by the third contact hole, inspecting defects in an array by applying a test signal to the at least one testing line, and removing the at least one testing line by scribing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 illustrates sections across lines I-I' to III-III' in FIG. 2, respectively.

FIG. 6 illustrates sections across lines I-I' to II-II' in FIG. 2 respectively and a thin film transistor.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1A:
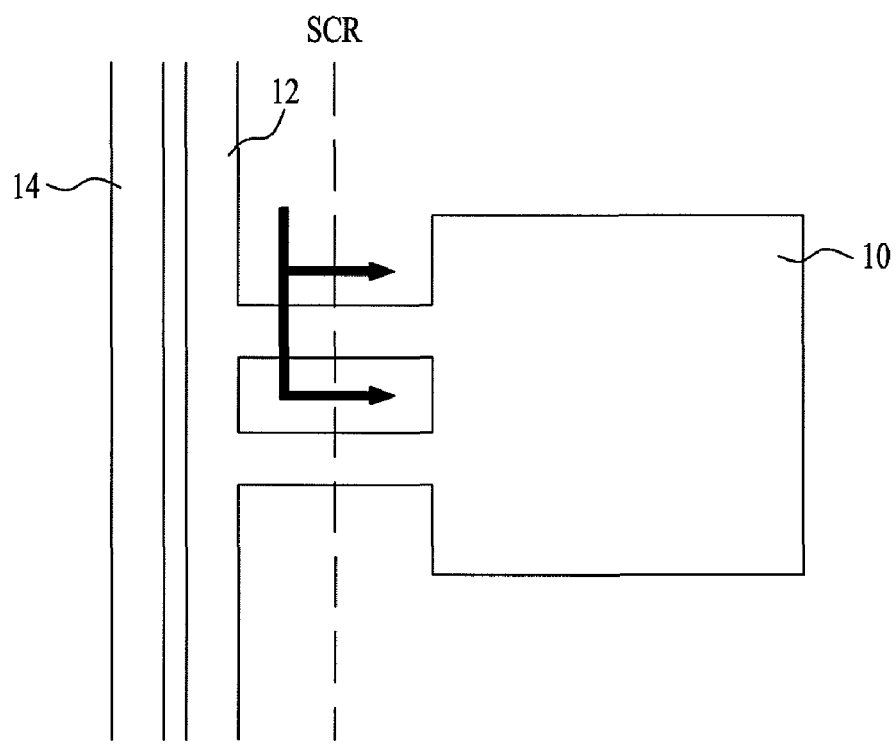
FIGS. 1A and 1B illustrate diagrams each showing a problem of electrolytic corrosion transmission to a related art liquid crystal display panel.
Figure 1B:
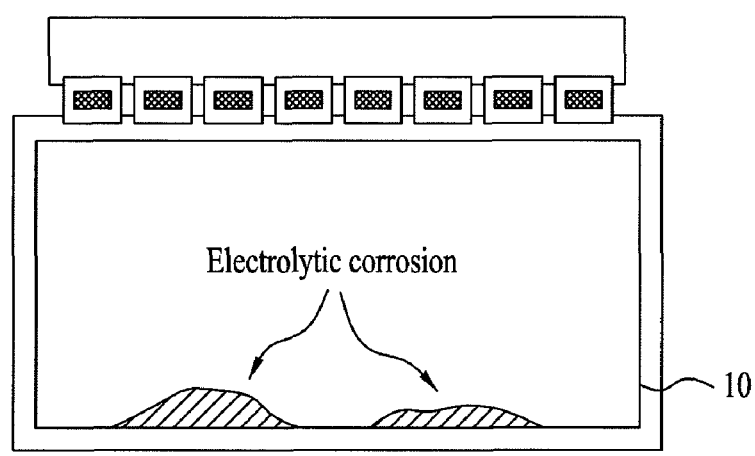
Figure 2:
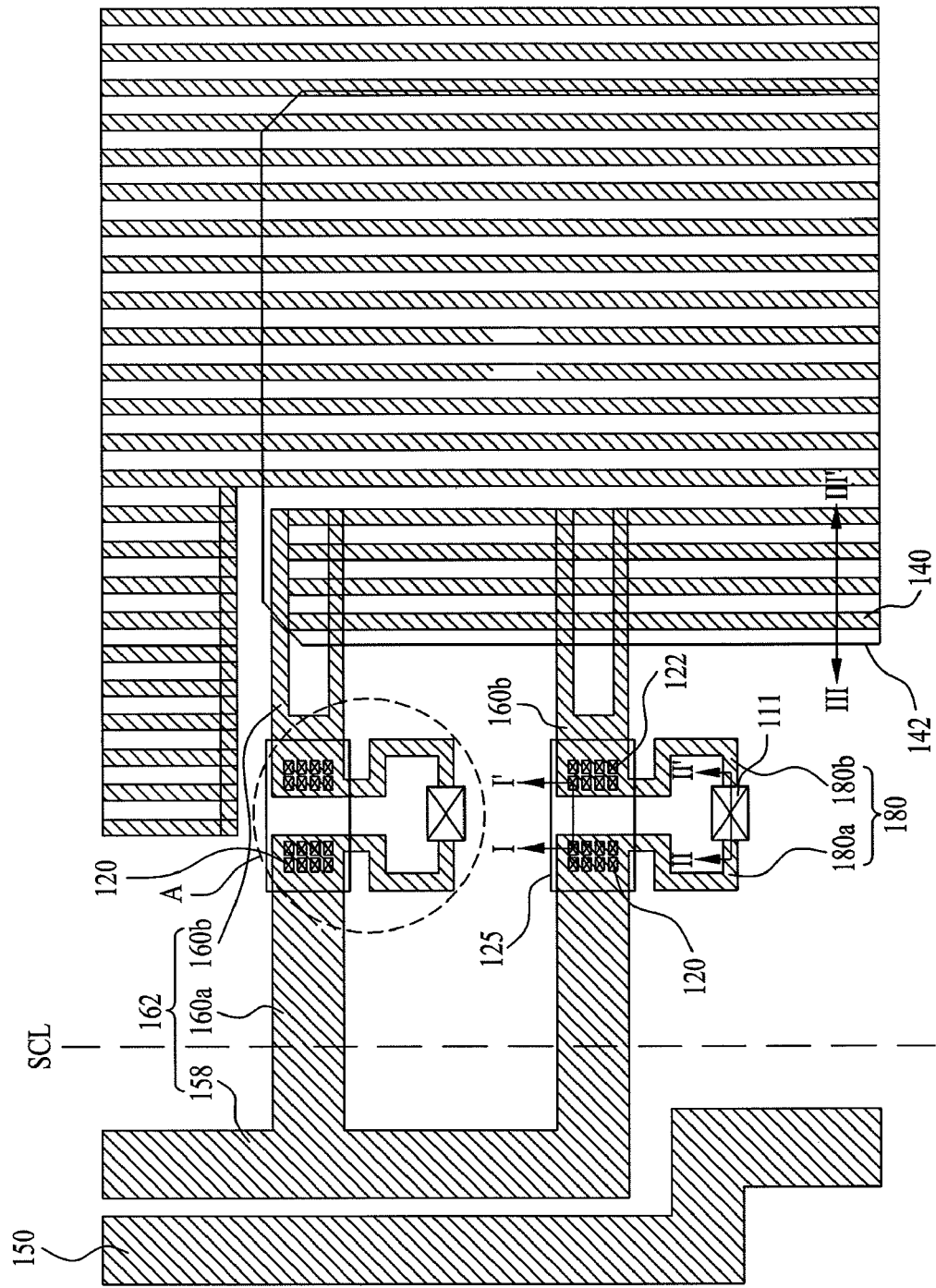
FIG. 2 illustrates a plan view of a testing portion for a liquid crystal display panel in accordance with a preferred embodiment of the present invention.

FIG. 2 illustrates a plan view of a testing portion for a liquid crystal display panel in accordance with a preferred embodiment of the present invention, and FIG. 3 illustrates sections across lines I-I' to III-III' in FIG. 2, respectively.

Referring to FIGS. 2 and 3, the testing portion for a liquid crystal display panel includes a testing signal supply line at a periphery of a substrate for testing existence of defects at the liquid crystal display panel, a testing line 140 connected to the testing signal supply line for applying a signal to the liquid crystal display panel, and an electrolytic corrosion blocking pattern 180 for preventing the electrolytic corrosion from transmitting from the testing signal supply line.

As a testing method for detecting an electric characteristic defects at a thin film transistor liquid crystal display panel, in general, there are an array test and a GGS (Gate Gate Short) test. The array test is a final test after finishing fabrication of the thin film transistor substrate, wherein a testing instrument having a liquid crystal layer, i.e., a modulator, is placed on the thin film transistor substrate, and a test signal is supplied to the thin film transistor substrate to display a test picture for inspecting existence of defective pixels and defective lines. If the liquid crystal display panel has defects, an electric field is changed by a voltage applied to the liquid crystal display panel and the modulator to change a light quantity transmitting through the modulator, thereby notice the defects by a difference of voltages at a portion having a difference of pixels, to detect the defects of the liquid crystal display panel.

The GGS test is a test of shorts, caused by foreign matters during deposition of gate metal layers or a photo process, of all connection portions of gate patterns after finishing formation of gate patterns of the gate metal layers.

Figure 4:
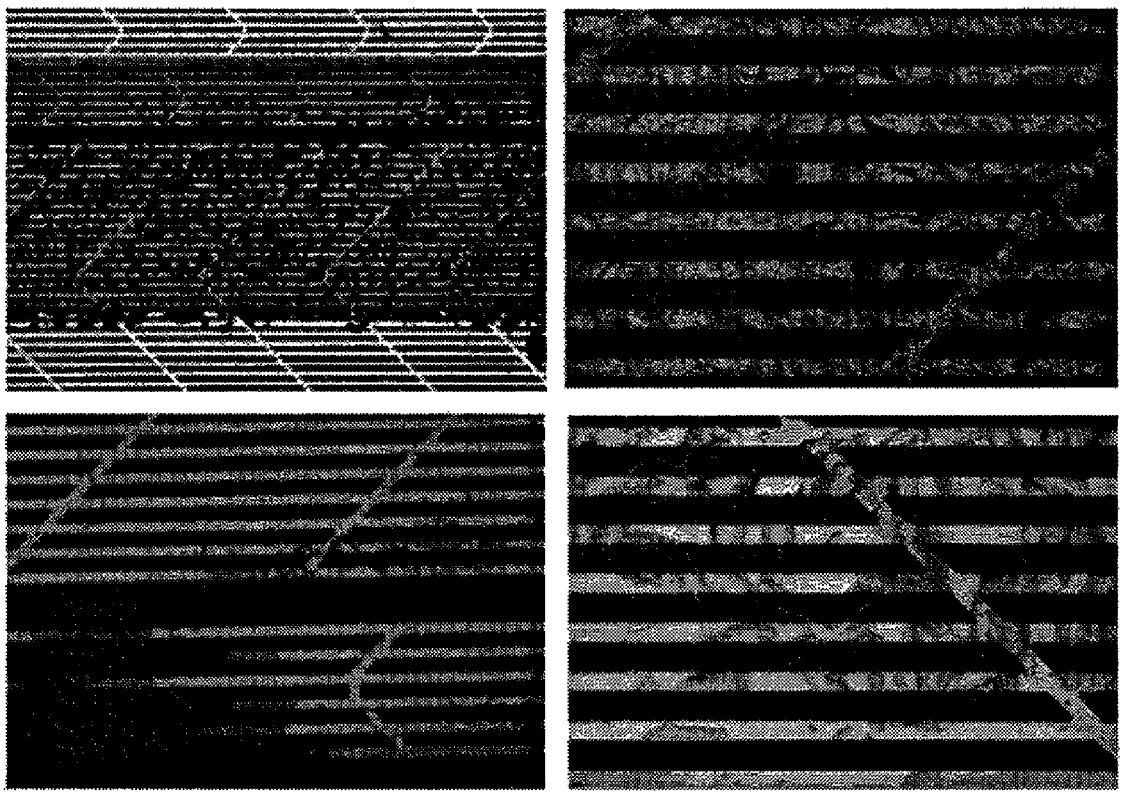
FIG. 4 illustrates photographs of seal breakage defects.

After finishing the testing, the testing signal lines are cut off by scribing SCR. In this instance, if the electrolytic corrosion takes place at the cut surface due to chemical or substrate contamination, the electrolytic corrosion transmits to an inside of the liquid crystal display panel through the testing signal supply line. In other words, currently, at the time of a 0° C. low temperature driving assessment after −10° C. low temperature conservation, a minute electrolytic corrosion defect transmission to the inside of the liquid crystal display panel caused by the substrate contamination and infiltration of external contamination causes a panel crack, resulting in a seal breakage defect as shown in FIG. 4.

The testing signal supply line includes a first testing signal line 150 grounded to the inside of the liquid crystal display panel for applying a ground voltage, and a second testing signal line 162 for applying the common voltage Vcom to the common electrode (not shown). The second signal supply line 162 includes a vertical portion 158 formed in parallel to the first testing signal supply line 150, and a horizontal portion 160a, 160b branched from the vertical portion 158 for applying the signal to the liquid crystal display panel.

The horizontal portion includes a first horizontal portion 160a branched from the vertical portion 158, and a second horizontal portion 160b spaced from the first horizontal portion 160a and connected to the testing line 140 for applying the signal to the liquid crystal display panel. The first and second horizontal portions 160a and 160b are connected to a connection pattern 125 through at least one first and second contact holes 120 and 122 which are passed through the a gate insulating film 104 and a protective film 130, electrically. Since the electrolytic corrosion transmits following the gate metal layer, in order to prevent the electrolytic corrosion from transmitting, the first and second horizontal portions 160a and 160b are formed to be spaced apart from each other, and the first and second horizontal portions 160a and 160b spaced apart from each other thus are electrically connected by jumping with the connection pattern 125 of a transparent conductive layer which is resistant to the electrolytic corrosion and corrosion. The spaced distance between the first and second horizontal portions 160a and 160b are 20 μm~50 μm.

In this instance, though a plurality of the first and second contact holes 120 and 122 respectively in the first and second horizontal portions 160a and 160b may be formed singular, it is preferable that the plurality of contact holes are formed for preventing defective contact and enlarging a contact area.

The electrolytic corrosion blocking pattern 180 is connected to ends of the first and second horizontal portions 160a and 160b respectively, and formed of the gate metal layer (not shown) identical to the first and second horizontal portions 160a and 160b. After formation of the gate pattern of the gate metal layer (not shown), the GGS (Gate Gate Short) test is performed for testing whether shorts are taken place at the gate lines (not shown) or not. In this instance, the signal is applied to the liquid crystal display panel through a signal path of the vertical portion 158 of the second testing signal supply line 162 for applying the common voltage, the first horizontal portion 160a, the electrolytic corrosion blocking pattern 180, and the second horizontal portion 160b.

After the GGS test, the electrolytic corrosion blocking pattern 180 is disconnected by a third contact hole 111 which penetrates through the protective film 130, the gate insulating film 104, and the electrolytic corrosion blocking pattern 180, dividing the electrolytic corrosion blocking pattern 180 into a first electrolytic corrosion blocking pattern 180a connected to the first horizontal portion 160a and a second electrolytic corrosion blocking pattern 180b connected to the second horizontal portion 160b. Since the electrolytic corrosion blocking pattern 180 is divided into the first electrolytic corrosion blocking pattern 180a and the second electrolytic corrosion blocking pattern 180b thus, a signal and electrolytic corrosion transmission path from the first horizontal portion 160a to the second horizontal portion 160b is blocked. In this instance, the signal is applied to the inside of the liquid crystal display panel through a signal path of the vertical portion 158 of the second testing signal supply line 162, the first horizontal portion 160a, the connection pattern 125, and the second horizontal portion 160b.

Figure 5:
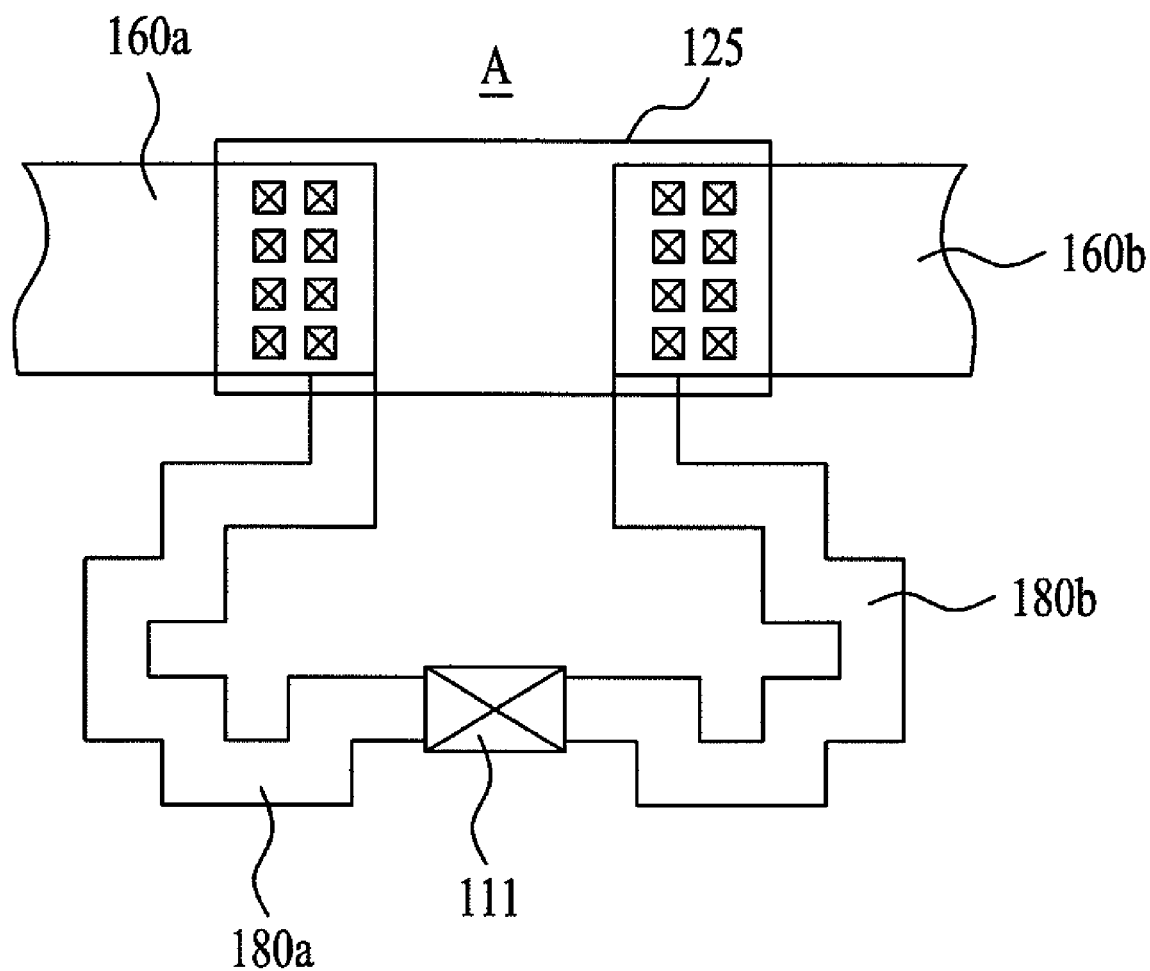
FIG. 5 illustrates a diagram of an electrolytic corrosion blocking pattern in accordance with another preferred embodiment of the present invention.

Referring to FIG. 5, the electrolytic corrosion blocking pattern 180 may be formed to be circular, elliptical, polygonal, or zigzag for making the electrolytic corrosion transmission path longer.

At the time of the array test, the signal is applied to the liquid crystal display panel through the testing line 140 until the region of the testing signal line is cut off, and the testing line 140 is floated on an underside of a seal pattern after the region is cut off. Formed on the testing line 140, there is a testing pattern 142 having the gate insulating film 104, the protective film 130, and the transparent conductive line. The testing pattern 142 is in contact with the testing line 140 so as to be connected electrically thereto for applying the common voltage applied to the testing line 140 to a common electrode (not shown) on the color filter substrate (not shown) through a conductive ball at the seal pattern.

FIG. 6 illustrates sections across lines I-I' to II-II' in FIG. 2 respectively and a thin film transistor.

Referring to FIG. 6, the testing signal supply line, the thin film transistor TFT and the electrolytic corrosion blocking pattern 180 are formed on the substrate 100.

The thin film transistor TFT includes a gate electrode 102 branched from the gate line (not shown), a gate insulating film 104 formed on an entire surface of the substrate 100 having the gate electrode formed thereon, a semiconductor layer formed on the gate insulating film 104 overlapped with the gate electrode 102, a source electrode 110a formed on the semiconductor layer 108 branched from the data line (not shown), and a drain electrode 110b formed on the semiconductor layer 108 opposite to the source electrode 110a.

The semiconductor layer 108 includes an active layer 108b and an ohmic contact layer 108a formed by patterning an amorphous silicon a-Si layer and an impurity $n^+$ doped amorphous silicon layer.

The thin film transistor TFT has the protective film 130 formed thereon having a pixel contact hole 112 which exposes the drain electrode 110b formed therein, and is connected to the pixel electrode 115 and the drain electrode 110b through the pixel contact hole 112, electrically.

The first and second testing signal supply lines 150 and 162 are formed of a gate metal layer at the same layer with the gate electrode 102 of the thin film transistor TFT, the gate insulating film 104 and the protective film 130 are formed in succession on the first and second horizontal portions 160a and 160b of the second testing signal supply line 162 shown in FIG. 6, the first and second horizontal portions 160a and 160b are exposed by the first and second contact holes 120 and 122 respectively which passes through the gate insulating film 104 and the protective film 130, and the connection pattern 125 connects the first and second horizontal portions 160a and 160b to each other through the first and second contact holes 120 and 122, respectively.

The gate metal layer includes single layer or plural layers of a metal selected from molybdenum Mo, aluminum Al, aluminum-neodymium Al—Nd, copper Cu, chromium Cr, and titanium Ti or an alloy thereof.

The connection pattern 125 is formed of a transparent conductive material resistant to the electrolytic corrosion and corrosion identical to the pixel electrode 115 at the same layer with the pixel electrode 115. The transparent conductive material may be one selected from indium tin oxide ITO, tin oxide TO, indium zinc oxide IZO, and indium tin zinc oxide ITZO.

The electrolytic corrosion blocking pattern 180 is connected to the first and second horizontal portions 160a and 160b, and has the gate insulating film 104 and the protective film 130 formed thereon in succession, is divided into the first electrolytic corrosion blocking pattern 180a connected to the first horizontal portion 160a and the second electrolytic corrosion blocking pattern 180b connected to the second horizontal portion 160b by a third contact hole 111 which passes through the protective film 130, the gate insulating film 104, and the electrolytic corrosion blocking pattern 180.

FIGS. 7A to 7D illustrate sections showing the steps of a method for fabricating the thin film transistor substrate in FIG. 6.

Figure 7A:
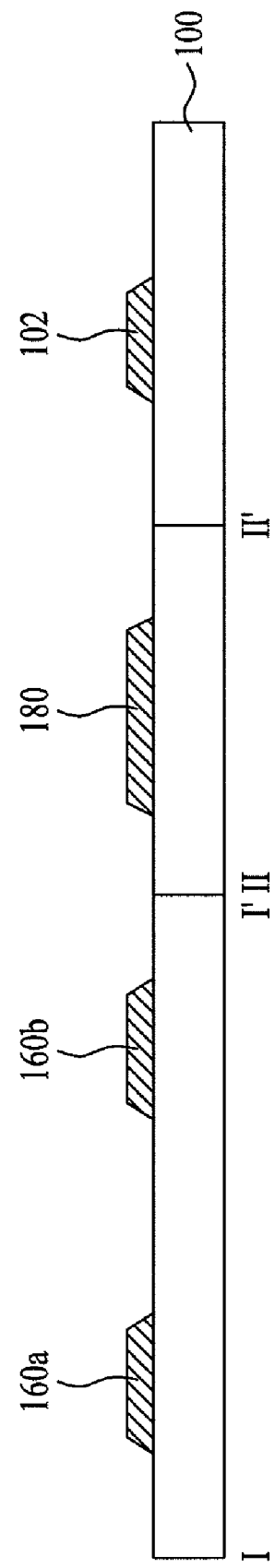
FIGS. 7A to 7D illustrate sections showing the steps of a method for fabricating the thin film transistor substrate in FIG. 6.

Referring to FIG. 7A, a gate pattern is formed on a substrate 100, having a gate line (not shown), a gate electrode 102, testing signal supply lines 150 and 162, and an electrolytic corrosion blocking pattern 180.

In detail, a gate metal layer is formed on the substrate 100 by deposition such as sputtering, and subjected to patterning with a mask by photolithography and etching, to form first and second horizontal portions 160a and 160b of a second testing signal supply line 162 spaced from each other for applying a common voltage, an electrolytic corrosion blocking pattern 180 connected to an end of each of the first and second horizontal portions 160a and 160b, and a gate electrode 102. The first and second horizontal portions 160a and 160b are 20 μm~50 μm spaced from each other.

The gate metal layer includes single layer or plural layers of a metal selected from molybdenum Mo, aluminum Al, aluminum-neodymium Al—Nd, copper Cu, chromium Cr, and titanium Ti or an alloy thereof.

After formation of the gate pattern of the gate metal layer, GGS test is performed for inspection of shorts between the gate patterns. In this instance, the signal is applied to an inside of the liquid crystal display panel through a signal path of the vertical portion 158 of the second testing signal supply line 162 for applying the common voltage to the liquid crystal display panel, the first horizontal portion 160a, the electrolytic corrosion blocking pattern 180, and the second horizontal portion 160b.

Figure 7B:
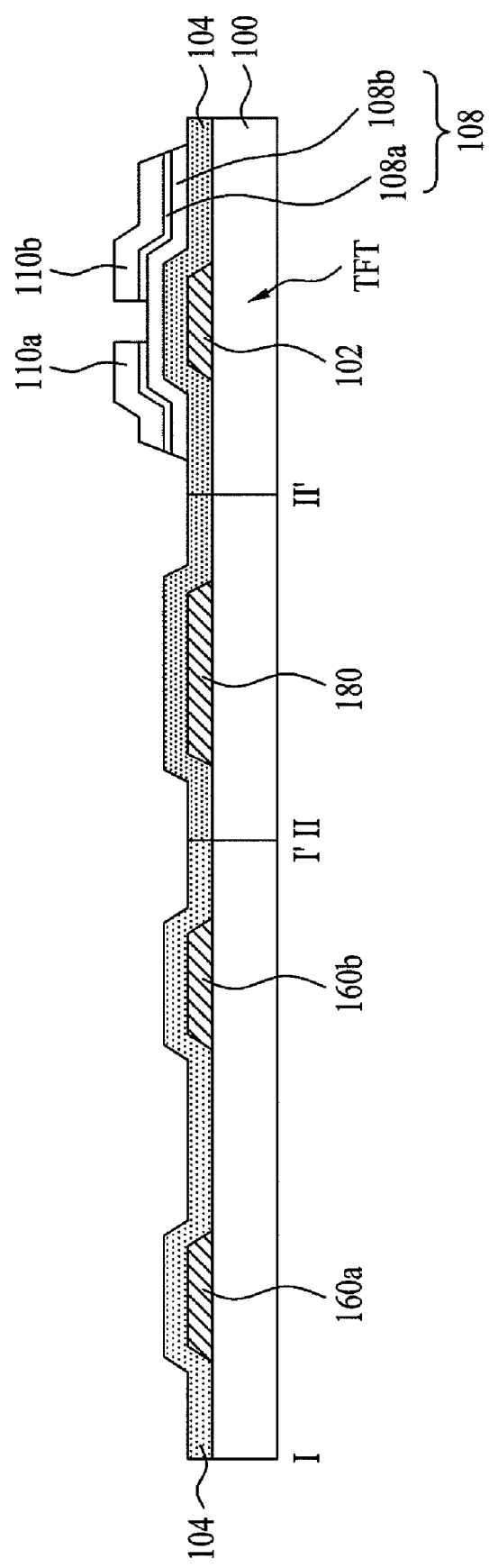

Then, referring to FIG. 7B, a gate insulating film 104, an amorphous silicon a-Si layer, and an impurity $n^+$ doped amorphous silicon layer are formed on an entire surface of the thin film transistor substrate 100 including the gate pattern by deposition, such as PECVD (Plasma Enhanced Chemical Deposition), or the like. Then, a source/drain metal layer is formed by deposition, such as sputtering, and subjected to patterning with a mask by photolithography and etching to overlap with the gate electrode 102, to form a semiconductor layer 108 having an active layer 108b and an ohmic contact layer 108a, and a thin film transistor having source and drain electrodes 110a and 110b. In this instance, for electrical isolation of the source electrode 110a and the drain electrode 110b and the ohmic contact layer 108a, diffractive exposure or a half-tone mask is used.

The gate insulating film 104 is formed of an inorganic insulating material, such as silicon oxide SiOx and silicon nitride. The source and drain metal layers are single layer or plural layers of a metal selected from molybdenum Mo, aluminum Al, aluminum-neodymium Al—Nd, copper Cu, chromium Cr, titanium Ti, an alloy of molybdenum Mo and titanium Ti MoTi, an alloy of titanium and neodymium TiNb or an alloy thereof.

Figure 7C:
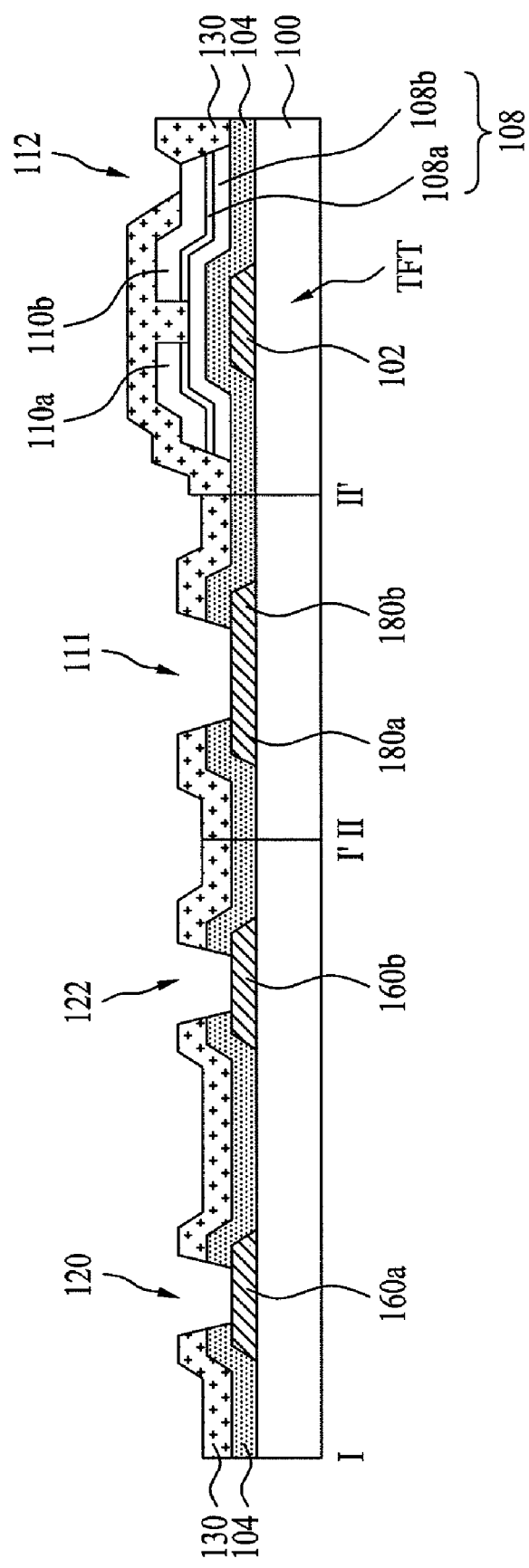

Referring to FIG. 7C, a protective film 130 having first to third contact holes 120, 122, and 111, and a pixel contact hole 112 is formed on an entire surface of the substrate including the thin film transistor TFT, and subjected to patterning with a mask by photolithography, and etching, to form first and second contact holes 120 and 122 which expose the first and second horizontal portions 160a and 160b respectively, a third contact hole 111 which exposes the electrolytic corrosion blocking pattern 180, and a pixel contact hole 112 which exposes the drain electrode 110b of the thin film transistor TFT.

The protective film 130 is formed of an inorganic insulating material, such as the gate insulating film 104, by deposition, such as PECVD, or of an acryl group organic compound, or of organic insulating material, such as BCB (Benzocyclobuten), PFCB (Perfluorocyclobutane), Teflon, Cytop, and so on, by spin or spinless coating.

Figure 7D:
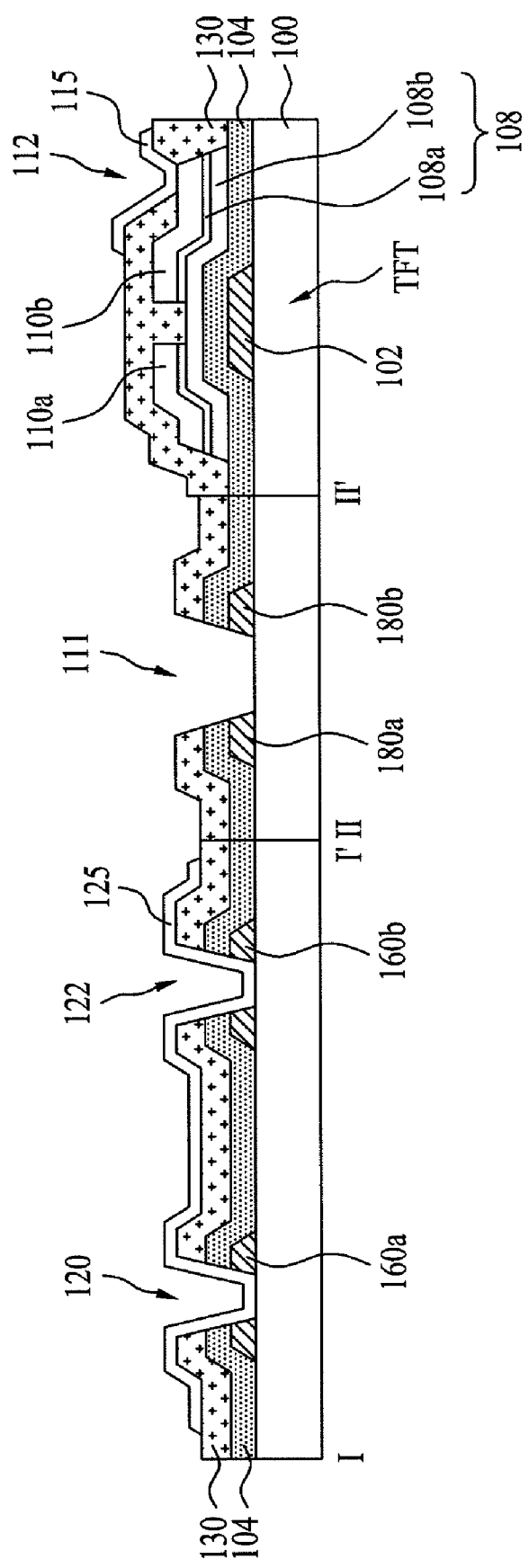

Referring to FIG. 7D, the connection pattern 125 and the pixel electrode 115 are formed on the protective film 130, and the electrolytic corrosion blocking pattern 180 is divided into the first and second electrolytic corrosion blocking patterns 180a and 180b.

In detail, a transparent conductive material is deposited on the protective film 130, and subjected to patterning with a mask by photolithography and etching to form the connection pattern connecting the first and second horizontal portions 160a and 160b electrically through the first and second contact holes 120 and 122, and the pixel electrode 115 electrically connected to the drain electrode 110b through the pixel contact hole 112.

In this instance, since the third contact hole 111 exposes the electrolytic corrosion blocking pattern 180, the electrolytic corrosion blocking pattern 180 exposed thus at the same time with patterning of the connection pattern 125 and the pixel electrode 115 is removed by the etching, to divide the electrolytic corrosion blocking pattern 180 into the first and second electrolytic corrosion blocking patterns 180a and 180b.

The transparent conductive material may be one selected from indium tin oxide ITO, tin oxide TO, indium zinc oxide IZO, and indium tin zinc oxide ITZO.

After finishing formation of the thin film transistor substrate thus, the array test is performed. That is, the testing instrument having a liquid crystal layer, i.e., a modulator, is placed on the thin film transistor substrate, and a test signal is supplied to the thin film transistor substrate to display a test picture for inspecting existence of defective pixels and defective lines. If the liquid crystal display panel has defects, an electric field is changed by a voltage applied to the liquid crystal display panel and the modulator to change a light quantity transmitting through the modulator, thereby notice the defects by a difference of voltages at a portion having a difference of pixels, to detect the defects at the liquid crystal display panel.

After finishing the test, edge regions of the substrate is scribed, to cut of the testing signal supply lines 150 and 162.

In this instance, if electrolytic corrosion takes place at a cut surface due to chemical or substrate contamination, since the electrolytic corrosion transmits to an inside of the liquid crystal display panel through the testing signal supply lines, to cause a crack which leads to a defect of seal breakage, the electrolytic corrosion blocking pattern 180 is divided to block the signal and electrolytic corrosion transmission path. In this instance, the signal is applied to the inside of the liquid crystal display panel through a signal path of the vertical portion 158, the first horizontal portion 160a, the connection pattern 125, and the second horizontal portion 160b. This permits immediate application of the present invention to mass production without occupying large space.

As has been described, the liquid crystal display panel and the method for testing the same of the present invention have the following advantages.

The connection of the first and second horizontal portions of the testing signal supply line spaced from each other with the connection pattern of an electrolytic corrosion resistant material permits to block transmission of the electrolytic corrosion to the liquid crystal display panel when the testing signal supply line is cut off.

By forming the electrolytic corrosion blocking pattern connected to the first and second horizontal portions of the testing signal supply line to be isolated, a transmission pattern of the electrolytic corrosion can be blocked, and the seal breakage defect caused by panel crack coming from the electrolytic corrosion can be prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for testing a liquid crystal display panel comprising the steps of:
    forming gate lines and at least one testing signal supply line having first and second horizontal portions spaced from each other for applying a testing signal to the liquid crystal display panel, and first and second electrolytic corrosion blocking patterns connected to ends of the first and second horizontal lines respectively on a substrate;
    testing shorts of the gate lines;
    forming a gate insulating film on the testing line and the first and second electrolytic corrosion blocking patterns;
    forming a protective film having first and second contact holes which expose the first and second horizontal portions and a third contact hole which exposes the electrolytic corrosion blocking pattern;
    dividing a connection pattern formed of a material resistant to the electrolytic corrosion for connecting the first horizontal portion to the second horizontal portion through the first and second contact holes, and the first and second electrolytic corrosion blocking patterns by the third contact hole;
    inspecting defects in an array by applying a test signal to the at least one testing line; and
    removing the at least one testing line by scribing.

2. The method as claimed in claim 1, wherein the space between the first and second horizontal portions is 20 µm~50 µm.

3. The method as claimed in claim 1, wherein the electrolytic corrosion blocking pattern is formed of a material identical to the gate line at the same layer with the gate line, and
    the connection pattern is formed of a material identical to the pixel electrode at the same layer with the pixel electrode.

4. The method as claimed in claim 1, wherein the connection pattern is formed of one selected from indium tin oxide ITO, tin oxide TO, indium zinc oxide IZO, and indium tin zinc oxide ITZO.

5. The method as claimed in claim 1, wherein the electrolytic corrosion blocking pattern is circular, elliptical, polygonal, or zigzag.

* * * * *